(12) United States Patent
Maruyama et al.

(10) Patent No.: US 6,419,307 B1
(45) Date of Patent: Jul. 16, 2002

(54) COMPONENT MOUNTING STRUCTURE AND COMPONENT MOUNTING METHOD

(75) Inventors: Toshio Maruyama, Toyohashi; Masaaki Yamagata, Ijirino Soujya, both of (JP)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/659,523

(22) Filed: Sep. 12, 2000

(30) Foreign Application Priority Data

Sep. 13, 1999 (JP) .......................................... 11-258486

(51) Int. Cl.⁷ ................................................ B60N 3/02
(52) U.S. Cl. ............................ 296/214; 24/290; 24/297
(58) Field of Search ............................... 296/214, 39.1, 296/152, 153, 97.9, 71, 191; 411/508, 509, 913; 24/290, 297

(56) References Cited

U.S. PATENT DOCUMENTS

| | | | | |
|---|---|---|---|---|
| 2,386,922 A | * | 10/1945 | Andrews et al. | 411/913 X |
| 3,099,931 A | * | 8/1963 | Ferdinand | 411/913 X |
| 3,217,584 A | * | 11/1965 | Amesbury | 411/508 |
| 4,730,836 A | * | 3/1988 | Miller et al. | 411/508 X |
| 4,973,212 A | * | 11/1990 | Jacobs | 411/508 |
| 4,981,322 A | * | 1/1991 | Dowd et al. | 296/214 |
| 5,662,375 A | * | 9/1997 | Adams et al. | 296/214 |
| 5,881,989 A | * | 3/1999 | O'Brien et al. | 24/297 X |

FOREIGN PATENT DOCUMENTS

| | | | | |
|---|---|---|---|---|
| DE | 2 201 058 | * | 7/1973 | .................. 411/508 |
| GB | 2 155 422 A | * | 9/1985 | .................. 296/152 |
| JP | 61-50805 | | 4/1986 | |
| JP | 63-155719 | | 10/1988 | |
| JP | 5-96533 | | 12/1993 | |

\* cited by examiner

*Primary Examiner*—Joseph D. Pape
*Assistant Examiner*—Patricia L. Engle
(74) *Attorney, Agent, or Firm*—Edward D. Murphy

(57) ABSTRACT

A component mounting structure is for temporarily fastening a small component (2) such as an assist grip to a large component (3) such as a large interior or exterior component of an automobile. A fastening hole of the small component is aligned with a fastening hole of the large component and the small component is temporarily fastened to the large component by inserting a clip (1) into the both fastening holes. The clip comprises a first engagement portion (6) to be brought into surface-contact with the large component, a shank (7) extending from the first engagement portion, and a second engagement portion (9) integrally formed with the shank (7) so as to be engaged with the small component, wherein the first engagement portion, the shank, and the second engagement portion of the clip are formed to have a hollow portion so that a screw component can axially be inserted therein. The screw component (13) is inserted and held in the clip under the temporary fastening condition.

14 Claims, 13 Drawing Sheets

FIG. 11
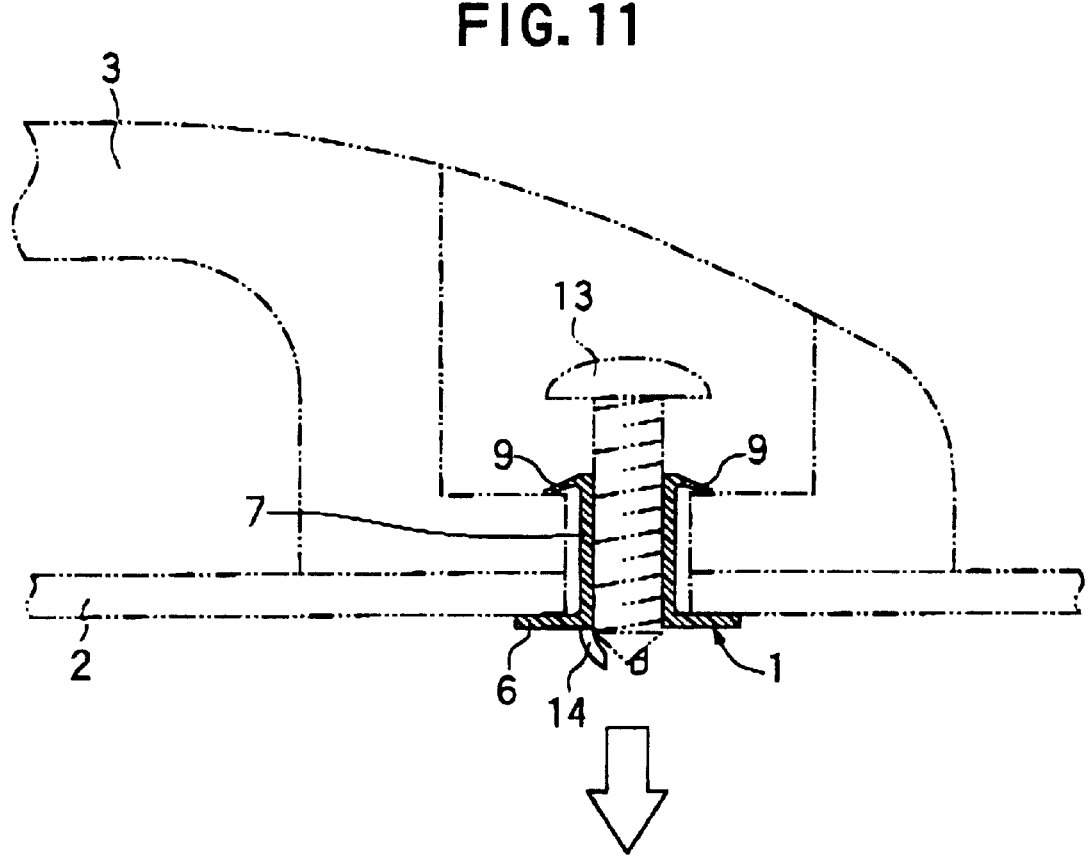
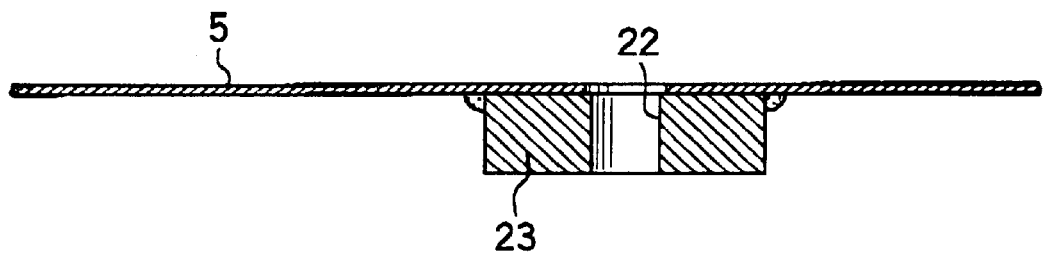

COMPONENT MOUNTING STRUCTURE AND COMPONENT MOUNTING METHOD

BACKGROUND OF THE INVENTION

The present invention relates to a component mounting structure for temporarily fastening a small component such as an assist grip of an automobile to a large component such as large interior or exterior component of the automobile, and also relates to a component mounting method for permanently fixing these temporarily-fastened components to a panel, such as a vehicle body.

In a conventional method for permanently fixing a small component such as an assist grip and a large component such as a head-lining of the automobile to a panel such as a vehicle body, the large component and small component are separately supplied to an automobile assembling line and then are fastened individually to the panel on the assembling line. Accordingly, it is necessary to prepare individual separate storing areas for the large and small components near the assembling line. Further, this separate fastening causes a necessity of changing fastening tools and results in a disadvantage of a deteriorated working efficiency. Japanese Utility Model Publication No. 61-50805 discloses a component mounting structure in which a temporary fastening clip is attached beforehand to a vehicle body and a welded bolt of an exterior component is inserted into the temporary fastening clip to temporarily fasten the exterior component thereto. Although this structure makes it easy to fasten an exterior component, it does not solve the problems described above in fixing the large and small components to the vehicle body. Japanese Utility Model Publication No. 63-155719 discloses another component mounting structure for fixing a component to a base body by employing a bracket having a function as a spacer to provide a certain space between the base body and the component to be fixed thereto. The component mounting structure described in this publication, however, also does not solve the problems described above in fastening a large component and a small component to a vehicle body. Further, Japanese Utility Model Publication No. 5-96533 discloses a collar which allows a flexible sheet member to be fastened to a panel placing a certain distance between the panel and a component to be fastened when the flexible sheet member is to be sandwiched between the panel and the component to be fastened. The collar described in this publication, however, also does not solve the problems described above.

SUMMARY OF THE PRESENT INVENTION

According to the present invention, since a large component and a small component in a temporary fastening condition together with a screw component are transported and supplied to an automobile assembling line, it is unnecessary to prepare individual separate storing areas for the large and small components near the automobile assembling line and further the necessity of changing fastening tools in case of separate fastening is eliminated and thereby the working efficiency is improved. Further, when this component mounting structure for temporary fastening is employed, the large and small components can be firmly fixed to the panel only by implementing the simple steps of placing this component mounting structure on the panel, aligning the front end of the screw component with the fixing hole of the panel, and screwing the screw component around the centerline thereof into the nut provided on the panel, and thereby the permanent fixing operation can be made quite simple.

Accordingly, the object of the present invention is to provide a component mounting structure in which a small component such as an assist grip is temporarily fastened beforehand to a large component such as a head-lining of an automobile and a set of the temporarily-fastened large and small components is transported and supplied to an automobile assembling line so that the components can be permanently fixed to a panel such as a vehicle body.

Another object of the present invention is to provide a component mounting method in which the component fastening structure described above is employed so that a temporarily-fastened large and small components may be transported and supplied to an automobile assembling line and then permanently fixed to a panel such as a vehicle body.

The object of the present invention described above can be achieved by a component mounting structure for temporarily fastening a small component such as an assist grip to a large component such as a large interior or exterior component of an automobile, in which a fastening hole of the small component is aligned with a fastening hole of the large component and the small component is temporarily fastened to the large component by inserting a clip into both the fastening holes; the clip comprises a first engagement portion to be brought into surface-contact with the large component, a shank extending from the first engagement portion, and a second engagement portion integrally formed on the shank so as to be engaged with the small component, wherein the first engagement portion, the shank, and the second engagement portion of the clip are formed to have a hollow portion so that a screw component can axially be inserted therein; and the screw component is inserted and held in the clip in the temporary fastening condition. This structure allows the large and small components in a temporary fastening condition to be transported and supplied to an automobile assembling line and to be directly and permanently fixed as a unit to a vehicle body.

According to a preferable aspect of the present invention, the screw component is inserted into the shank of the clip from the second engagement portion toward the first engagement portion, and preferably a front end of the screw component extending out beyond the first engagement portion is at least partially covered by a protruding piece extending from the shank to prevent the front end of the screw component from being exposed. This structure eliminates the possibility that the front end of the screw component might cause a damage to others. Further, it is preferable that the protruding piece is composed of a plurality of thin pieces each being arranged at an equal space along an outer circumference of the shank for receiving the screw component, extending axially from the shank and being curved at the front end portion toward the centerline of the shank so that the protruding pieces as a whole may form a tapered front end. This structure makes it easy to find a fixing hole of a panel. Further it is preferable that the first engaging portion is a flange formed on one end of the shank and the second engaging portion is a pair of engaging pieces arranged on the other end of the shank so as to be capable of being deflected toward the centerline of the shank when the clip is being inserted into the fastening hole. Besides these, it is also preferable that the first engaging portion is an elongated plate member extending from one end of the shank of a clip in a right angle with respect to the axial direction of the shank; the elongated plate member has another clip formed integrally therewith connected at an end of a shank thereof extending in a right angle with respect to the elongated plate member, each clip being spaced by a predetermined distance from the other; and the second engagement portion of each clip is formed on the other end of each shank as a pair of engagement pieces which can be deflected toward the centerline of the shank when the clip is being inserted into the fastening hole. The elongated plate member may be used as a member for defining a distance between fastening portions of the assist grip. Further, the plate member may be an impact-absorbing component.

Further, according to the present invention, there is provided a component mounting method for permanently fixing the large and small components to a panel such as a vehicle body using the component mounting structure defined by claim 1, the method comprising the steps of: placing on the panel the temporarily fastened large and small components including the clip and the screw components according to claim 1; aligning the front end of the screw component held in the clip shank with the fastening hole of the panel; and firmly fixing the large and small components to the panel by screwing the screw component around the centerline thereof into a nut provided on the panel. This method makes the permanent fixing operation quite simple.

BRIEF DESCRIPTION OF THE ACCOMPANYING DRAWINGS

Figure 1:
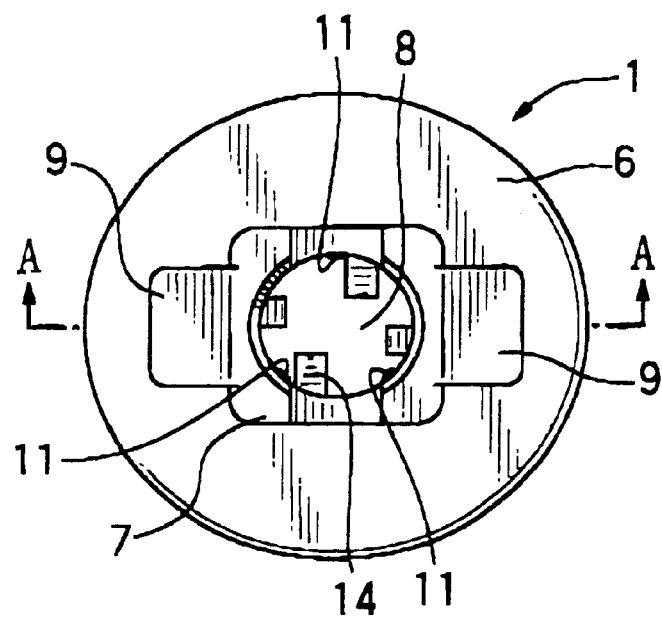
FIG. 1 is a top plan view of a clip used for a component mounting structure according to the present invention.
Figure 2:
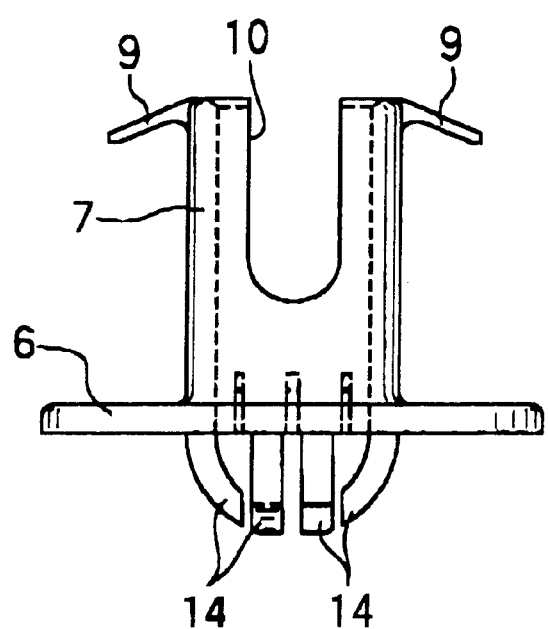
FIG. 2 is a front view of the clip of FIG. 1.
Figure 3:
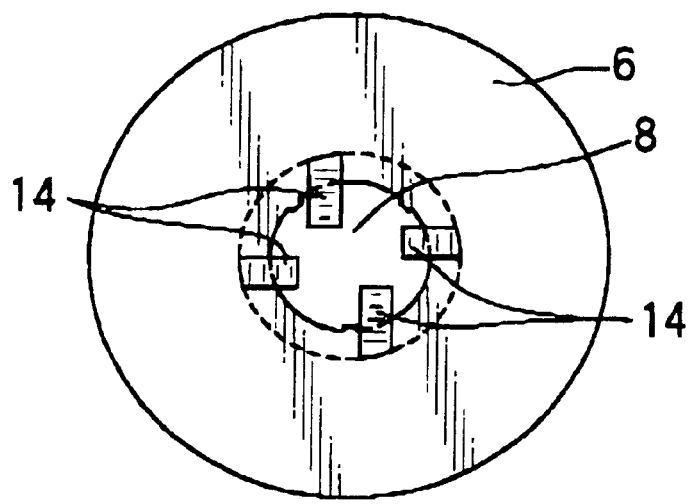
FIG. 3 is a bottom view of the clip of FIG. 1.
Figure 4:
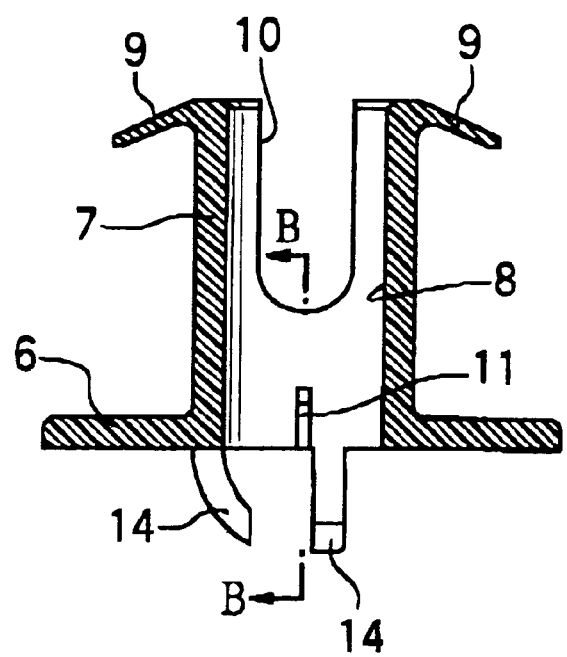
FIG. 4 is a cross sectional view of the clip taken on line A—A of FIG. 1.
Figure 5:
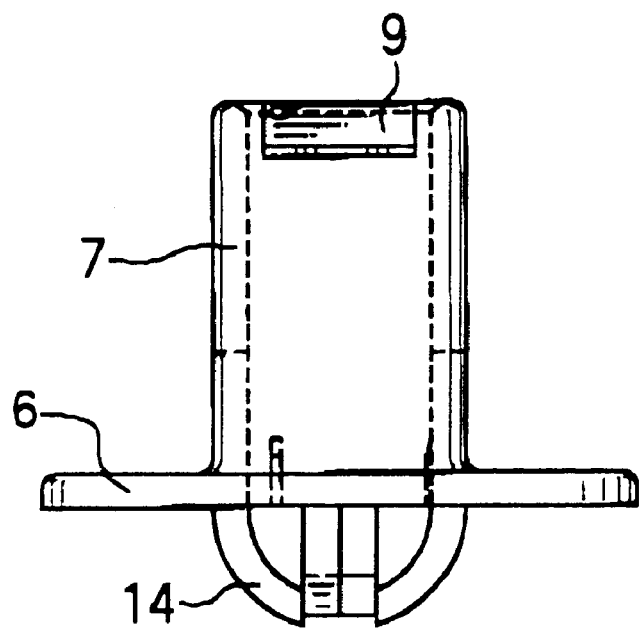
FIG. 5 is a side view of the clip of FIG. 1.
Figure 6:
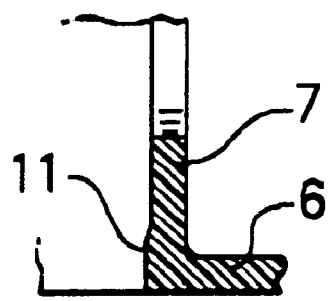
Figure 7:
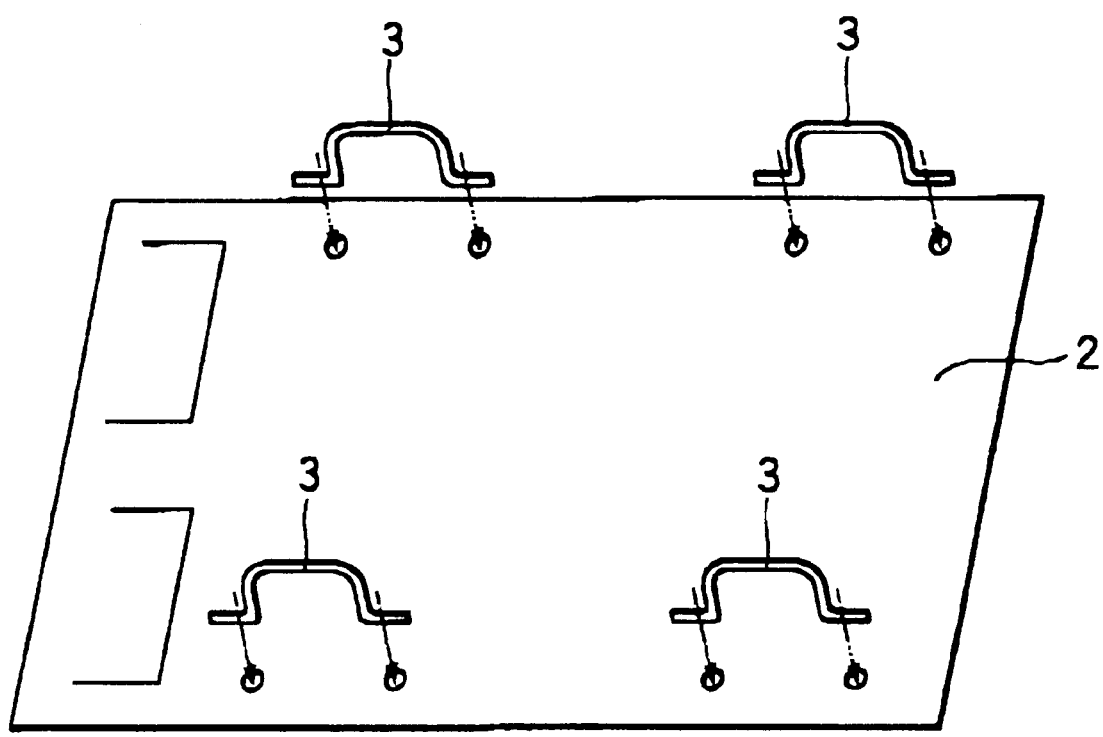
Figure 8:
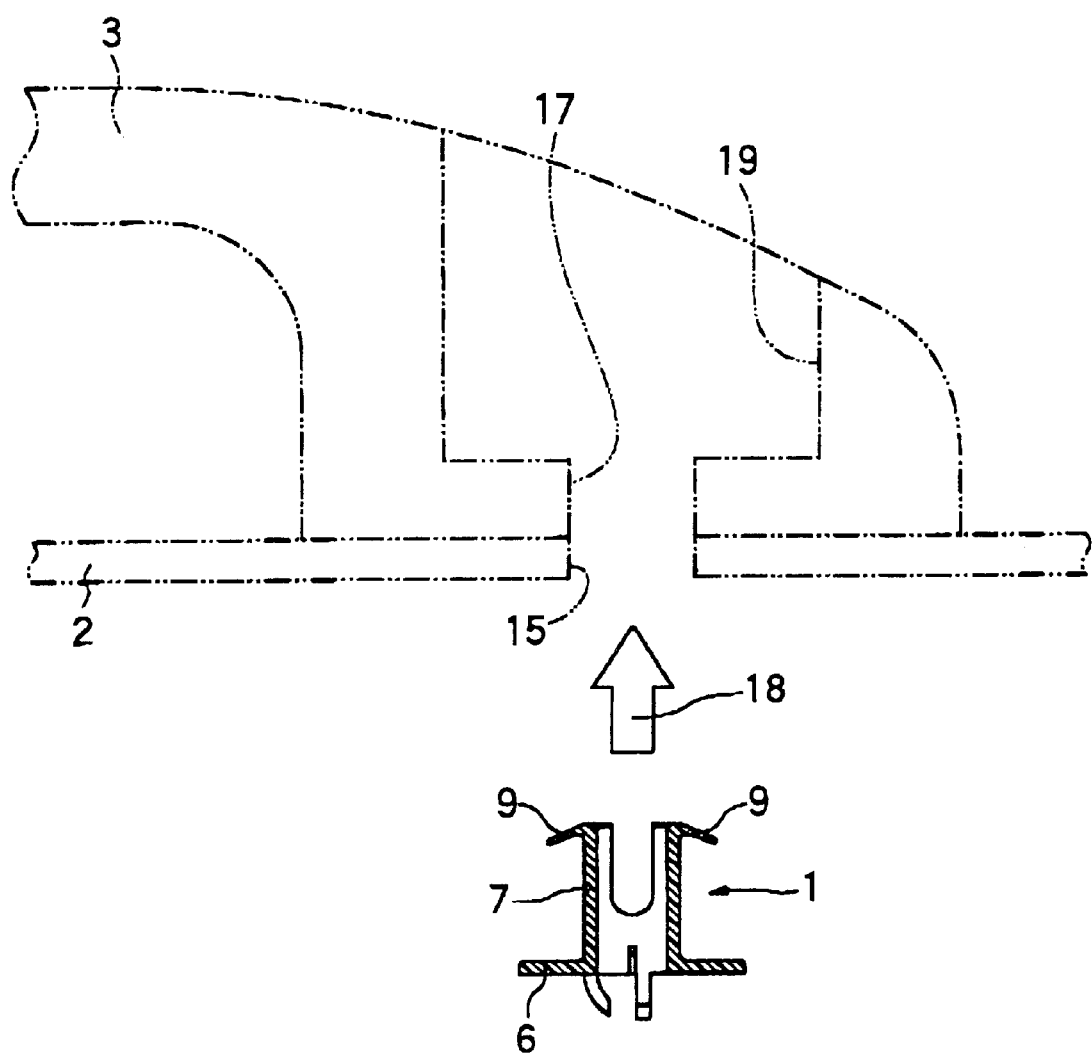
Figure 9:
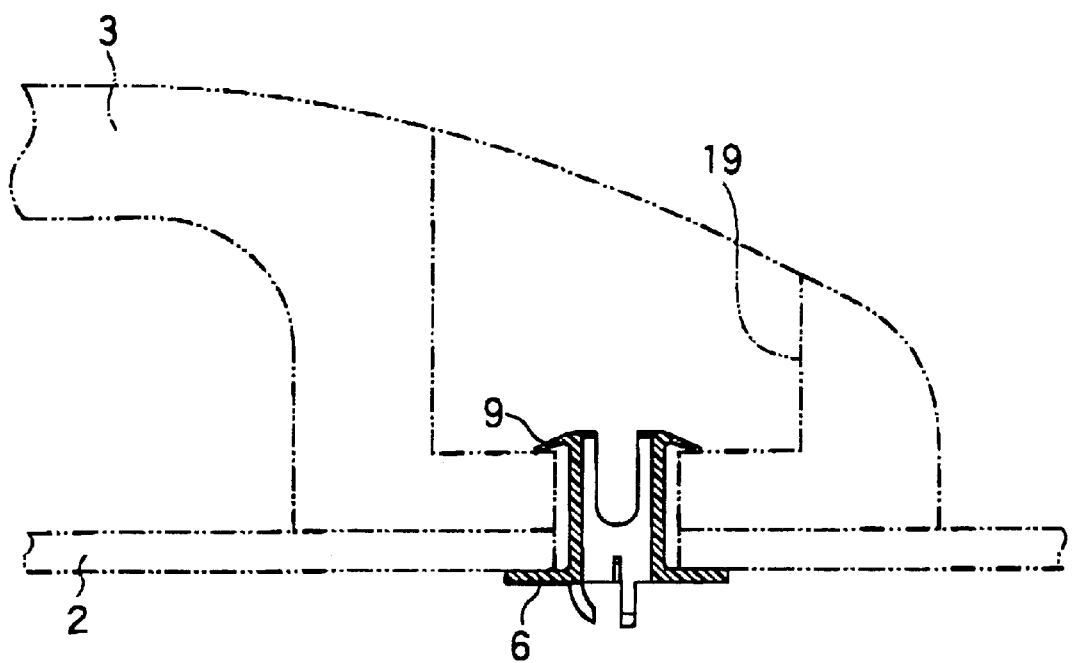
Figure 10:
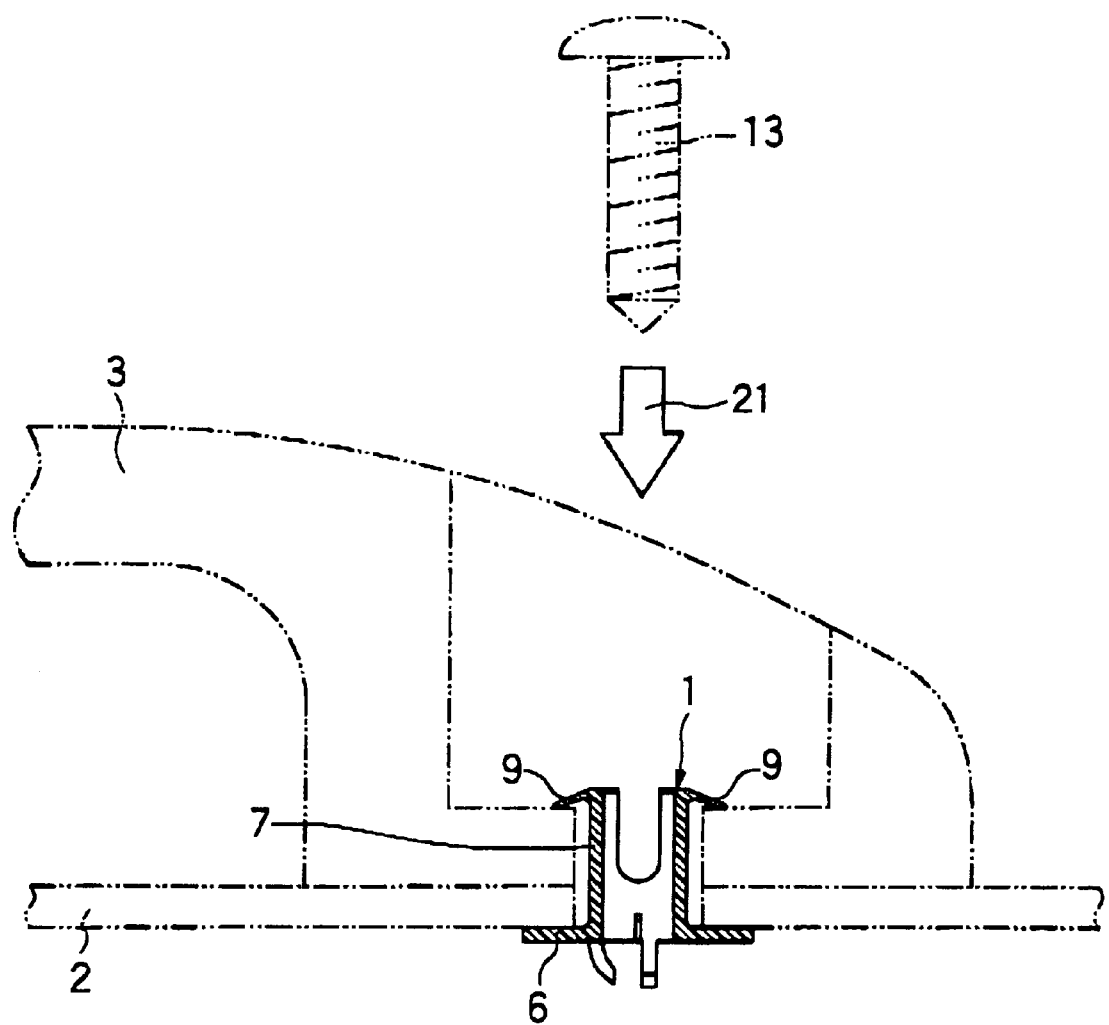
Figure 12:
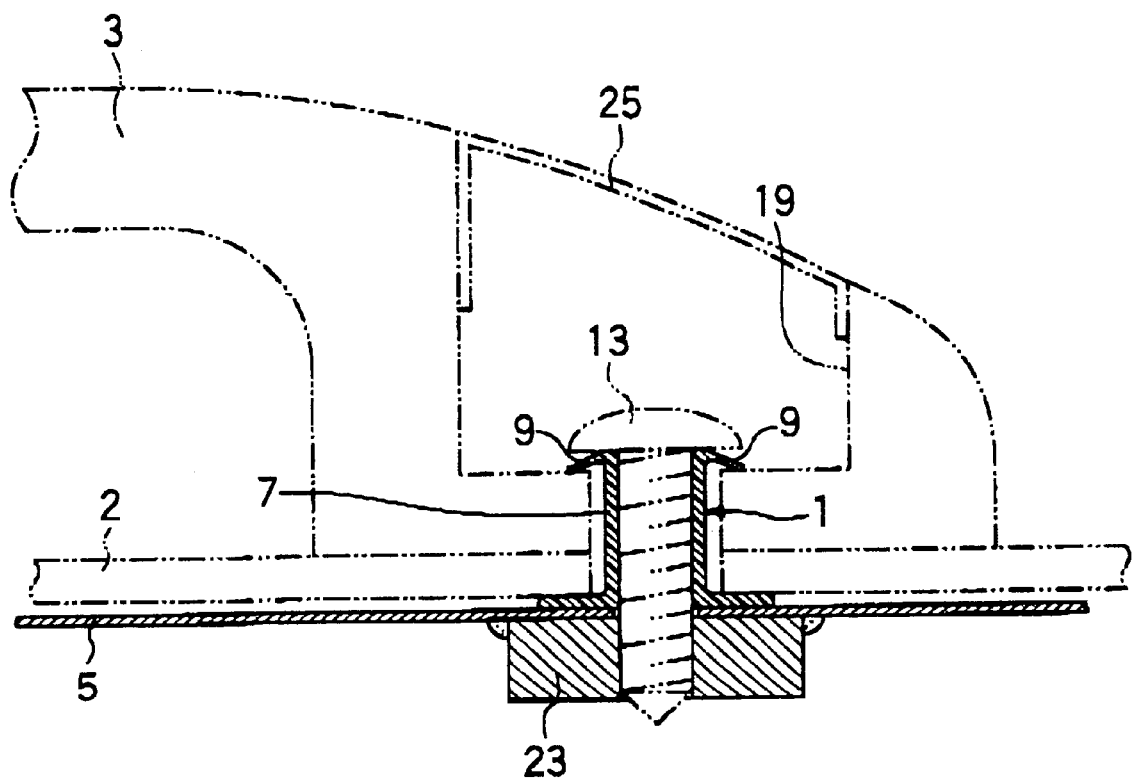
Figure 13:
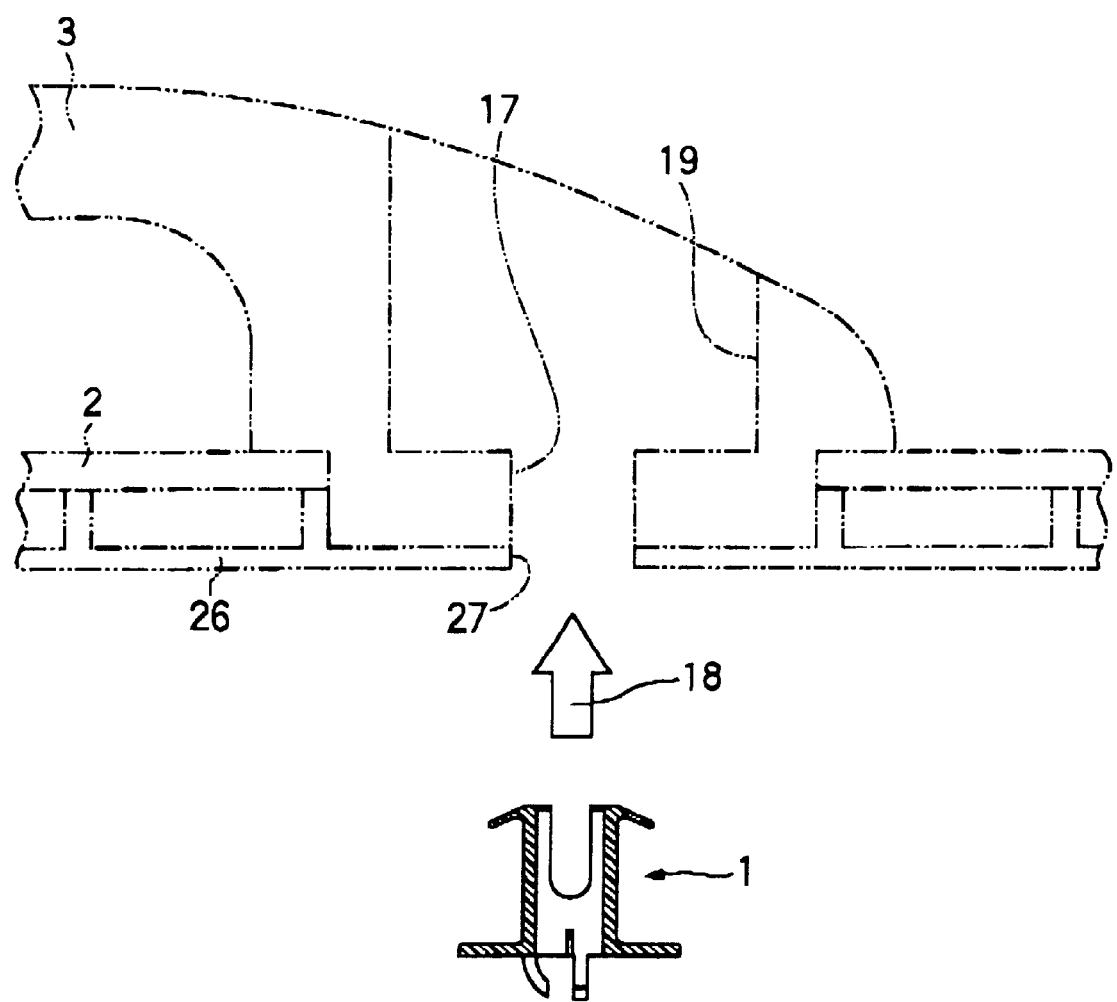
Figure 14:
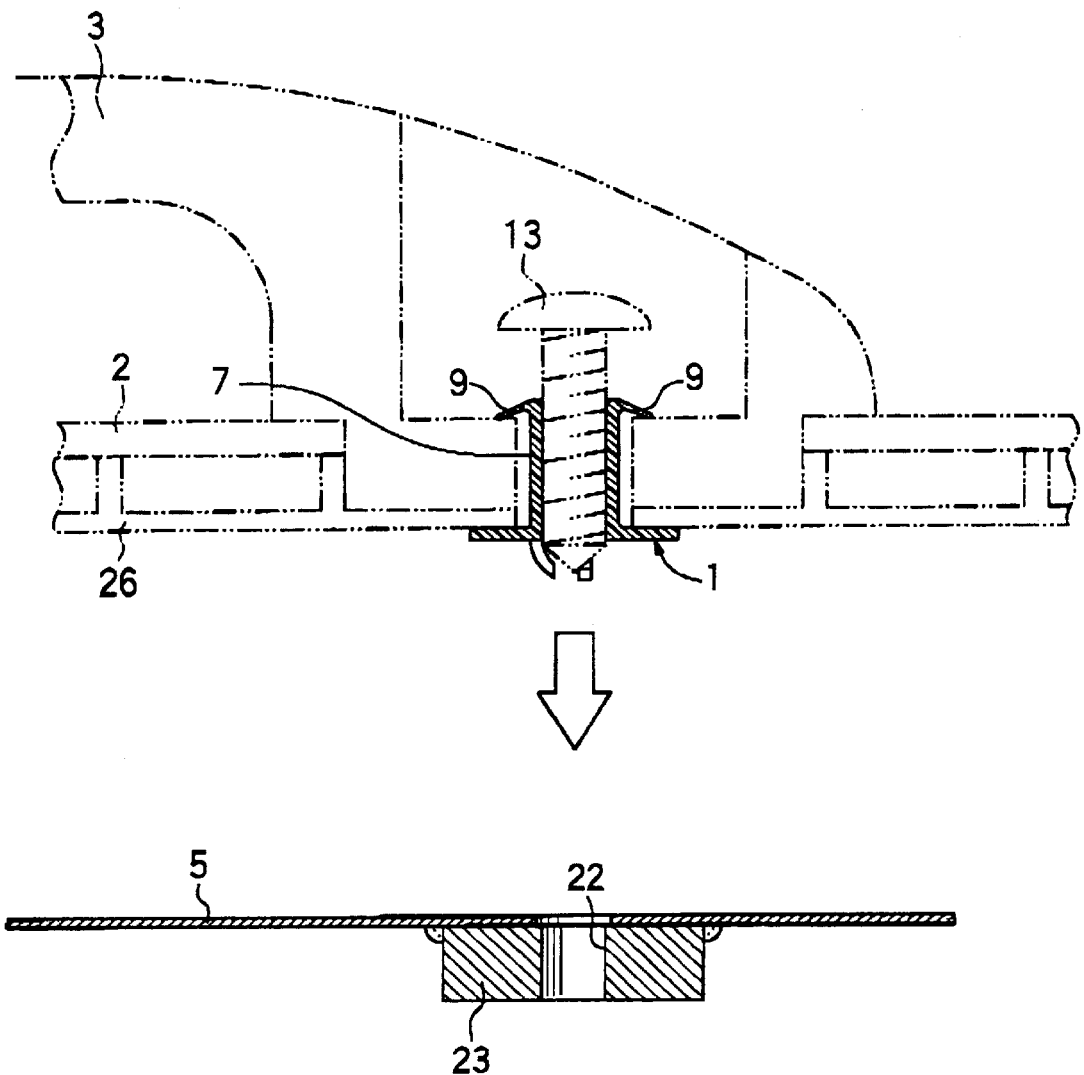
Figure 15:
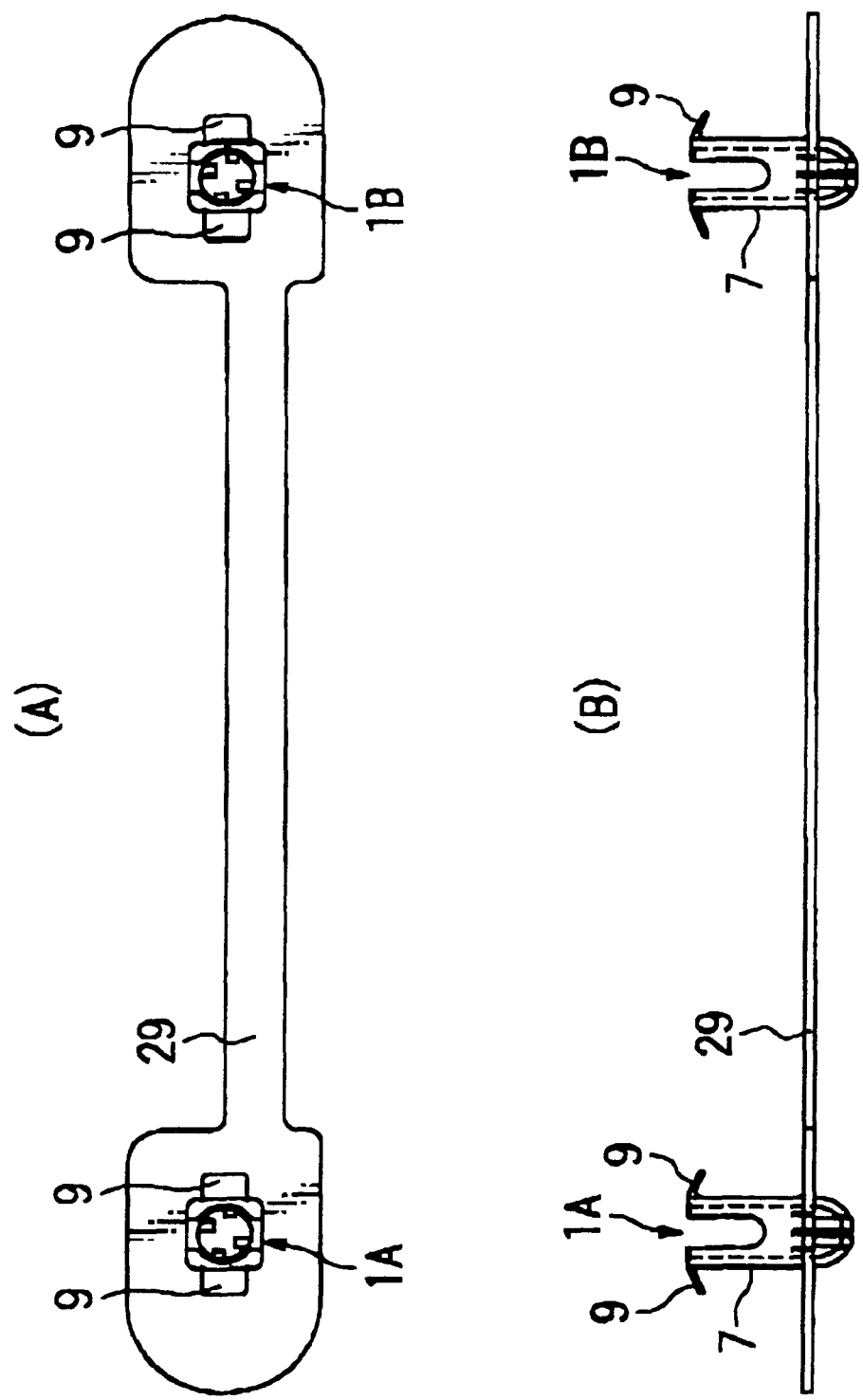
Figure 16:
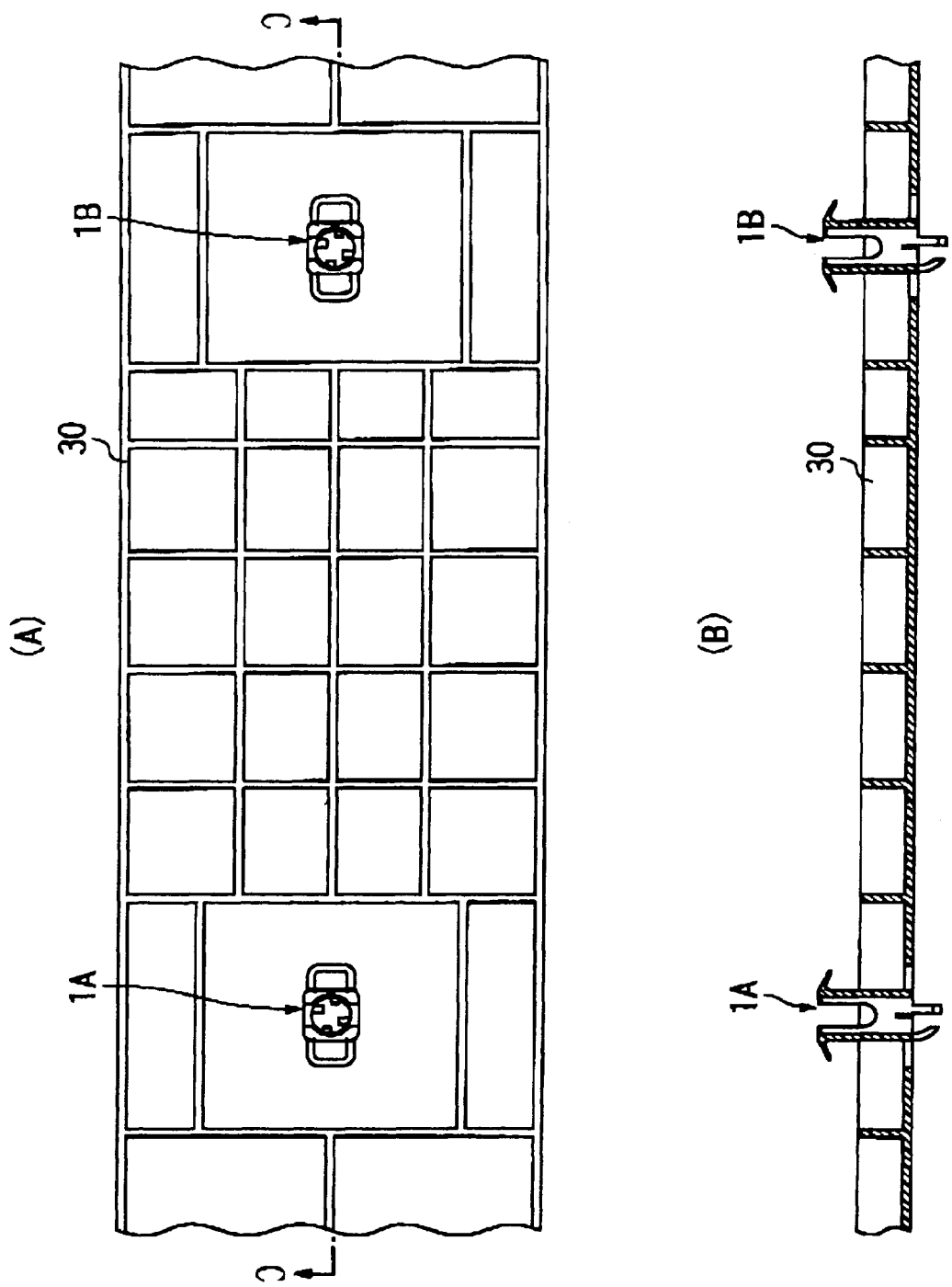

FIG. 6 a cross sectional view of the clip taken on line B—B of FIG. 4;

FIG. 7 is a development illustrating a relationship between a head-lining (a large component) and assist grips (small components);

FIG. 8 shows a condition before the assist grip is fastened to the head-lining using the clip of FIG. 1;

FIG. 9 shows a condition after an assist grip is temporarily fastened to a head-lining using the clip of FIG. 1;

FIG. 10 shows how a screw component is inserted into a temporarily-fastened headlining and assist grip of FIG. 9;

FIG. 11 shows a condition before a component mounting structure according to the present invention is fixed to a vehicle body;

FIG. 12 shows a condition in which a component mounting structure according to the present invention is permanently fixed to a vehicle body;

FIG. 13 shows a condition in which an impact absorbing material is temporarily fastened additionally to an assist grip and a head-lining before a clip is attached thereto;

FIG. 14 shows how a component mounting structure in which an impact-absorbing component is temporarily fastened additionally to the assist grip and the head-lining of FIG. 13 is fixed to a vehicle body;

FIG. 15 shows an alternative clip, wherein (A) is a plan view thereof and Fig (B) is an elevational view thereof; and FIG. 16 shows another alternative clip, wherein (A) is a plan view thereof and (B) is a cross sectional view thereof taken on line C—C of FIG (A).

DETAILED DESCRIPTION OF THE PREFERRED EMBODIMENTS

Preferred embodiments of the present invention will be described with reference to the attached drawings. FIGS. 1 to 12 show a component mounting structure according to a first embodiment of the present invention. FIGS. 1 to 6 show details of a temporary fastening clip 1 used in the component mounting structure. FIGS. 7 to 12 show how an assist grip 3 as a typical small component is temporarily fastened to an automobile head-lining 2 as a typical large component by a clip 1 and how assist grip 3 is temporarily fastened to the head-lining 2 by the clip 1, and how a component mounting structure in which an assist grip 3 and an automobile head-lining 2 are brought into a temporary fastening condition by a clip is permanently fixed to a vehicle body 5.

Then the clip 1 will be described with reference to FIGS. 1 to 6. The clip 1 is formed into an integrally molded plastic component, and comprises a flange 6 or a first engagement portion which is brought into surface-contact with a head-lining 2 as a large component so as to be engaged therewith, a shank 7 extending from the flange 6, and a pair of engagement pieces 9, 9 or second engagement portion which is integrally formed on the shank 7 so as to be engaged with an assist grip 3 as a small component. The flange 6, the shank 7, and the engagement pieces 9 of the clip 1 are formed to have a hollow portion therein (hollowed portion 8) so that a screw component can be inserted along an axial direction of the shank 7. The shank 7 has a slit 10 at one end portion thereof where the engagement piece 9 is formed so that the engagement piece 9 can easily be deflected inwardly in the radial direction and thereby facilitates the clip shank 7 to pass through a fastening hole of the head-lining 2 and a fastening hole of the assist grip 3. When the clip shank 7 is inserted into the fastening holes of the head-lining 2 and the assist grip 3 as shown in FIG. 8, the first engagement portion or flange 6 and the second engagement portions or pair of engagement pieces 9, 9 hold the head-lining 2 and the assist grip 3 in a temporary fastening condition as shown in FIG. 9. The engagement piece 9 may be formed into any shape, not limited to the one illustrated, so long as both components can be brought into a fastening condition when the clip shank 7 is inserted into the fastening holes of the large and small components.

The clip 1 is formed to have a hollow portion in the axial direction thereof, and a screw component is inserted into the clip shank 7 to be held therein. In order to prevent the inserted screw component from dropping off the shank 7, the shank 7 has on the inner face of the hollowed portion 8 a projection 11 projecting inwardly in the radial direction as shown in FIGS. 4, 6 so as to be engaged with the thread of the screw component. On the inner face of the hollowed portion 8, there may be formed only one projection 11, and preferably two or more projections spaced equally along the inner face. As shown in FIG. 10, the screw component 13 is inserted into the clip shank 7 from the engagement piece 9 side to the flange 6 side. Since the inserted screw component 13 is extended out through the head-lining to be screwed into a nut on a back face of the vehicle body when the assist grip is permanently fixed to the headlining, the screw component is formed to be longer than the clip shank 7. Accordingly, the front end of the screw component inserted into the shank 7 projects beyond the flange 6 and may possibly damage the vehicle body or a worker. For that reason, in order to prevent the front end of the screw component from being exposed, the front end is at least partially covered by a protruding piece 14 which is extended from an end portion of the shank 7 on the flange 6 side. As for this covering, the front end of the screw component is preferably covered partially, though may be covered wholly, because the partial covering makes it easier to insert and turn the screw component for the permanent fixing operation. The protruding piece 14 is composed of a plurality of thin pieces (four pieces in the illustrated example) which are equally spaced along the outer circumference of the shank to receive the screw component to be extended axially from the shank. The end portion of each protruding piece 14 is curved toward the centerline of the shank so that the protruding pieces 14 as a whole can form a tapered end. The tapered end formed by these protruding pieces 14 as a whole makes it easy to find the fixing hole of the vehicle body.

It will be described how a small component or an assist grip 3 is temporarily fastened to a large component or an automobile head-lining 2 by the clip 1 configured as described above. FIG. 7 shows a head-lining 2 and four assist grips 3 (three assist grips in some cases) before a temporary fastening condition. Each assist grip 3 is fastened to the head-lining 2 at two points respectively. The clip 1 is inserted into each fastening hole of each assist grip 3 and both components are brought into a temporary fastening condition. This temporary fastening is implemented at a site separate from an automobile assembling line, for example, at a head-lining manufacturer. First, as shown in FIG. 8, each assist grip 3 is positioned to the head-lining 2 such that a fastening hole 15 of the head-lining 2 is aligned with a fastening hole 17 of the assist grip 3. The shank 7 of the clip 1 is inserted with the engagement piece 9 at front, as shown by an arrow 18, into the fastening holes 15, 17. By this insertion, as shown in FIG. 9, the flange 6 is brought into surface-contact with an under face of the head-lining 2 and the engagement piece 9 is engaged with a bottom face of a fastening recess 19 of the assist grip 3, and thereby the assist grip 3 (small component) is temporarily fastened to the head-lining 2 (large component). The clip 1 is applied to each fastening hole of each assist grip 3, and this temporary fastening operation is implemented for each assist grip 3.

The screw component 13 is inserted into the clip shank 7 of the clip 1 for temporarily fastening the assist grip 3 to the head-lining 2, from the engagement piece 9 side toward the flange 6 as shown by an arrow 21 in FIG. 10. Since each protruding piece 14 protrudes out beyond the flange 6 to prevent the front end of the screw component from being exposed and the front end portion of each protruding piece 14 is curved toward the centerline of the shank so that the protruding pieces 14 as a whole form a tapered end, the screw component 13 is prevented from being further inserted when the front end of the screw component 13 comes into contact with the front end portion of protruding piece 14. Thus the screw component 13 is held by the temporarily-fastened head-lining 2 and assist grip 3. The upper half of FIG. 11 shows a component mounting structure according to the present invention in which the assist grip 3 is temporarily fastened to the head-lining 2 together with the screw component 13. The head-lining 2 and the assist grip 3 are shipped under this temporary fastening condition, for example, from a head-lining manufacturer to an automobile manufacturer. Accordingly, the assist grip 3 which is fastened to the head-lining together with the screw component 13, as shown in FIG. 11, can be mounted on the vehicle body 5. Thus, it is not necessary to prepare individual separate storing areas for the large component such as the head-lining 2 and the small component such as the assist grip 3 near an assembling line, and the necessity of changing fastening tools is eliminated and thereby the working efficiency is improved.

In the permanent fixing operation, the head-lining 2 (large component) and the assist grip 3 (small component) in a temporary fastening condition together with the clip 1 and the screw component 13 are mounted on the vehicle body 5 or a panel and then the front end of the screw component 13 held in the clip shank 7 is aligned with the fixing hole 22 of the vehicle body 5. Since the protruding pieces 14 of the clip 1 protrude in a tapered front portion, this aligning operation can be implemented by inserting the tapered front portion into the fixing hole 22. A nut 23 is fixed by, for example, welding to a back face (under face) of the fastening hole 22 of the vehicle body. The screw component is turned by a worker around the axis thereof with a tool such as a screw driver to be screwed into the nut 23 fixed to the vehicle body 5, and thereby the head-lining 2 and the assist grip 3 are permanently and firmly fixed to the vehicle body 5. FIG. 12 shows the process how this permanent fixing operation is implemented. After this permanent fixing operation, the fastening recess 19 of the assist grip 3 is stuffed with a cap 25.

FIGS. 13 and 14 show an embodiment of a component mounting structure in which an impact-absorbing component 26 is temporarily fastened additionally to the head-lining 2 and the assist grip 3. As shown in FIG. 13, after the impact-absorbing component 26 is positioned to a lower face of the head-lining 2 and then a fastening hole 27 of the impact-absorbing component 26 is aligned with the fastening hole 17 of the assist grip 3, a clip 1 is inserted into these fastening holes. By this insertion, the head-lining 2, assist grip 3 and the impact-absorbing material 26 are brought into a temporary fastening condition, and further the screw component 13 is inserted into the clip shank 7, and thereby a component mounting structure in a temporary fastening condition is completed (FIG. 14). This component mounting structure is supplied to an automobile assembling line and then is permanently fixed to the vehicle body by turning the screw component.

FIG. 15 shows an alternative clip. In this embodiment, a first engagement portion 29 corresponding to the flange 6 is formed to be an elongated plate component extending from one end of the shank 7 in a right angle with respect to the axial direction of the shank 7. This elongated first engagement portion 29 has two clips 1A, 1B formed integrally therewith connected at respective ends of the clip shank 7 and extending in a right angle with respect thereto, each clip 1A or 1B being spaced from the other by a distance equal to that between the fastening holes 17 arranged at both ends of an assist grip 3. The second engagement portion of the clip body 1A (or 1B) is formed on the other end of each clip shank 7 as a pair of engagement pieces 9 which can be deflected toward the centerline of the shank when the clip shank is being inserted into the fastening holes, as those in the case of clip 1. No description on other structures of the present embodiment will be made because they are similar to those of clip 1. This structure allows two clips to be easily and simultaneously aligned with respective ends of the assist grip 3.

FIG. 16 shows another alternative clip. In this embodiment, a first engagement portion corresponding to the flange 6 is formed to be an elongated plate component, which is an impact-absorbing component 30 extending from one end of the shank 7 in a right angle with respect to the axial direction of the shank 7. This impact-absorbing member 30 or first engagement portion also has two clips 1A, 1B formed integrally therewith connected at respective ends of the clip shank 7 and extending in a right angle with respect thereto, each clip 1A or 1B being spaced from the other by a distance equal to that between the fastening holes 17 arranged at both ends of an assist grip 3. The second engagement portion of the clip body 1A (or 1B) is formed as a pair of engagement pieces 9 as those in the case of clip 1.

No description on other structures of the present embodiment will be made because they are similar to those of clip 1. This structure allows not only the impact-absorbing component to be easily fastened to the vehicle panel but also two clips to be easily and simultaneously aligned with respective ends of the assist grip 3.

In general, the above-identified embodiments are not to be construed as limiting the breadth of the present invention. It is understood that other modifications or other alternative constructions will be apparent which are within the scope of the invention as defined in the appended claims.

What is claimed is:

1. An assembly for attachment to a vehicle during manufacture thereof comprising:
   a. a handle;
   b. a headliner;
   c. a clip having a shank extending upwardly from a flange and formed with a hollow center;
   d. the shank having at least one flexible protrusion member formed at the upper end thereof;
   e. the clip temporarily connecting the handle and the headliner by engaging the handle and the headliner between the flange and the protrusion member of the clip; and
   f. a screw non-threadedly connected to the clip by being inserted into the hollow center of the shank thereof.

2. The combination claimed in claim 1 wherein:
   a. the handle having a hole therein;
   b. the headliner having a hole therein aligned with the hole in the handle;
   c. the clip first inserted into the aligned holes from the headliner end; and
   d. the flange and the projection disposed at either end of the shank to engage and hold the clip in position in the aligned holes.

3. The combination claimed in claim 2 wherein:
   a. the screw first inserted into the clip from the handle end;
   b. the screw having a head with a diameter larger than the diameter of the shank; and
   c. the screw having a lower end extending beyond the shank and below the flange of the clip.

4. The combination claimed in claim 3 wherein:
   a. a plurality of protective fingers formed on the clip to extend in spaced relationship to each other; and
   b. the lower end of the screw engaging the protective fingers and being partially covered thereby whereby contact with the extending lower end of the screw is normally prevented.

5. The combination claimed in claim 4 wherein:
   a. a pair of flexible protrusions formed at the upper end of the shank; and
   b. each of the flexible protrusions are bendable in the direction of the shank during insertion of the clip in the holes and thereafter will be extended substantially horizontally in engagement with the handle about the hole thereof.

6. An assembly for attachment to a vehicle during manufacture thereof comprising:
   a. a handle;
   b. a headliner;
   c. a clip having a shank extending upwardly from a flange and formed with a hollow center;
   d. the shank having at least one flexible protrusion member formed at the upper end thereof;
   e. the clip temporarily connecting the handle and the headliner by engaging between the flange and the protrusion member;
   f. a screw non-threadedly connected to the clip by being inserted into the hollow of the shank thereof; and
   g. a housing having a threaded hole to threadedly receive the screw to permanently connect the assembly thereto.

7. The combination claimed in claim 6 wherein:
   a. the clip is first inserted into the headliner before engaging the handle;
   b. the screw is inserted into the handle and will extend below the headliner; and
   C. the screw is threaded into the housing to permanently connect the assembly thereto.

8. The combination claimed in claim 7 wherein:
   a. the headliner is formed of impact-absorbing material.

9. A component mounting structure for temporarily fastening a small component to a large component of an automobile, the component mounting structure comprising:
   a. the small component has a hole therein;
   b. the large component has a hole therein aligned with the hole in the small component;
   c. a clip inserted into the pair of aligned holes to temporarily fasten the small component to the large component;
   d. the clip has a flange to engage the large component;
   e. a shank formed on the clip to extend upwardly from the flange and has a top engagement portion integrally formed thereon to engage the small component;
   f. the shank has a hollow central portion; and
   g. a screw is inserted and held, in a nonthreaded arrangement, in the clip under the temporary fastening condition.

10. The combination claimed in claim 9 wherein:
    a. a plurality of protective fingers formed about the central hollow portion to extend a short distance below the flange remote from the shank; and
    b. the front end of the screw extending below the flange of the clip to be partially covered by the protective fingers.

11. The combination claimed in claim 10 wherein:
    a. each of the protective fingers is curved toward the hollow central portion to define a tapered open web.

12. A method of temporarily connecting together a first and a second component having aligned holes, the method comprising the steps of:
    a. inserting a clip in the aligned holes of the first and the second components;
    b. holding the clip in place with the components by integrally formed extending members at either end of the clip engaging the components;
    c. inserting a screw in the clip;
    d extending the lower end of the screw outwardly of the clip; and
    e. protecting the lower end of the screw with protecting fingers formed on the clip to surround the same.

13. The method claimed in claim 12 including the additional steps of:
    a. inserting the clip from the first component into the second component; and
    b. inserting the screw into the clip from the second component into the first component.

14. A method of temporarily connecting together a first and a second component having aligned holes, the method comprising the steps of:

a. inserting a clip in the aligned holes of the first and the second components;
b. holding the clip in place with the components by integrally formed extending members at either end of the clip engaging the components;
c. inserting a screw in the clip;
d. inserting the clip from the first component into the second component;
e. inserting the screw into the clip from the second component into the first component;
f. extending the end of the screw outwardly to the first component and the clip; and
g. protecting the end of the screw with protecting fingers formed on the clip to extend outwardly of the first component and to partially cover the end of the screw.

* * * * *